United States Patent
Mack et al.

(10) Patent No.: US 7,823,529 B2
(45) Date of Patent: Nov. 2, 2010

(54) CERAMIC FOAM-FILLED SANDWICH PANELS AND METHOD

(75) Inventors: Julia J. Mack, Encino, CA (US); Janet B. Davis, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 980 days.

(21) Appl. No.: 11/438,387

(22) Filed: May 23, 2006

(65) Prior Publication Data

US 2007/0275177 A1 Nov. 29, 2007

(51) Int. Cl.
*B05C 13/00* (2006.01)

(52) U.S. Cl. .............................. 118/63; 118/52; 118/423

(58) Field of Classification Search ......... 427/226–229, 427/240, 348, 372.2, 375–380, 397.7–397.8, 427/387–388.5; 264/48, 602, 624–625, 650, 264/658; 118/66, 423, 63, 52
See application file for complete search history.

(56) References Cited

U.S. PATENT DOCUMENTS

| | | | | |
|---|---|---|---|---|
| 4,670,304 A | * | 6/1987 | Miura et al. ................ 427/227 |
| 4,801,496 A | | 1/1989 | Buchacher | |
| 5,436,083 A | * | 7/1995 | Haluska et al. ............. 428/688 |
| 5,849,406 A | * | 12/1998 | Daws ...................... 428/312.2 |
| 5,968,641 A | | 10/1999 | Lewis | |
| 6,478,874 B1 | * | 11/2002 | Rosynsky et al. ............. 118/63 |

FOREIGN PATENT DOCUMENTS

| | | |
|---|---|---|
| DE | 3320160 | * 12/1984 |
| DE | 3931976 A1 | 3/1990 |
| DE | 19903386 A1 | 8/2000 |
| DE | 19949775 A1 | 4/2001 |
| WO | WO 93/09933 | 5/1993 |

OTHER PUBLICATIONS

International Search Report dated May 21, 2008; 4 pgs.

* cited by examiner

*Primary Examiner*—Brenda A Lamb

(57) ABSTRACT

To produce a ceramic foam-filled structural sandwich panel, a coating of a pre-ceramic slurry is applied on a preform. The preform includes a foam template sandwiched between a plurality of panels. In addition, the coating is cured to the preform, the preform is modified, and the coating is converted to a ceramic.

7 Claims, 5 Drawing Sheets

CERAMIC FOAM-FILLED SANDWICH PANELS AND METHOD

FIELD OF THE INVENTION

The present invention generally relates to a ceramic foam-filled structural panel. More particularly, the present invention pertains to a ceramic foam-filled structural panel having improved thermal conductivity and structural characteristics and method of making.

BACKGROUND OF THE INVENTION

Ceramic materials are utilized to produce items that benefit from their inherent high temperature strength, thermal stability, abrasion resistance and a thermal conductivity that can be varied widely depending on the specific materials system and relative density. As such, ceramic materials are particularly useful heat shields. For example, thermal management of the frictional heating of space vehicle skins in particular presents some especially challenging problems that can be met with these materials. Optimal design is constrained by weight considerations, which penalize active cooling or solely ablative systems and reward structures that combine thermal and structural functions. In particular, vehicle performance may be optimized by the use of hot structures that combine thermal management materials. Furthermore, because machining thermal heat shields adds expense and increased production time, processing approaches that can be used to manufacture net-shaped or near net-shaped components are particularly attractive.

Accordingly, it is desirable to provide a ceramic structure capable of overcoming the disadvantages described herein at least to some extent.

SUMMARY OF THE INVENTION

The foregoing needs are met, to a great extent, by the present invention, wherein in one respect a ceramic component and method of making is provided.

An embodiment of the present invention pertains to a method of producing a ceramic item. In this method, a coating of a pre-ceramic slurry is applied to a preform. The preform is a sandwich structure comprised of a plurality of panels and contains a foam template. In addition, the coating is cured to the preform and template, the coating is converted to a ceramic and the resulting foam-filled structural sandwich panel is modified as required.

Another embodiment of the present invention relates to a system for producing a ceramic item. The system includes a means for applying a coating of a pre-ceramic slurry on a foam template-filled structural panel preform. The foam template is sandwiched between a plurality of composite layers. In addition, the system includes a means for curing the coating to the preform and template, a means for converting the coating to a ceramic, and a means for modifying the foam-filled structural sandwich panel.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
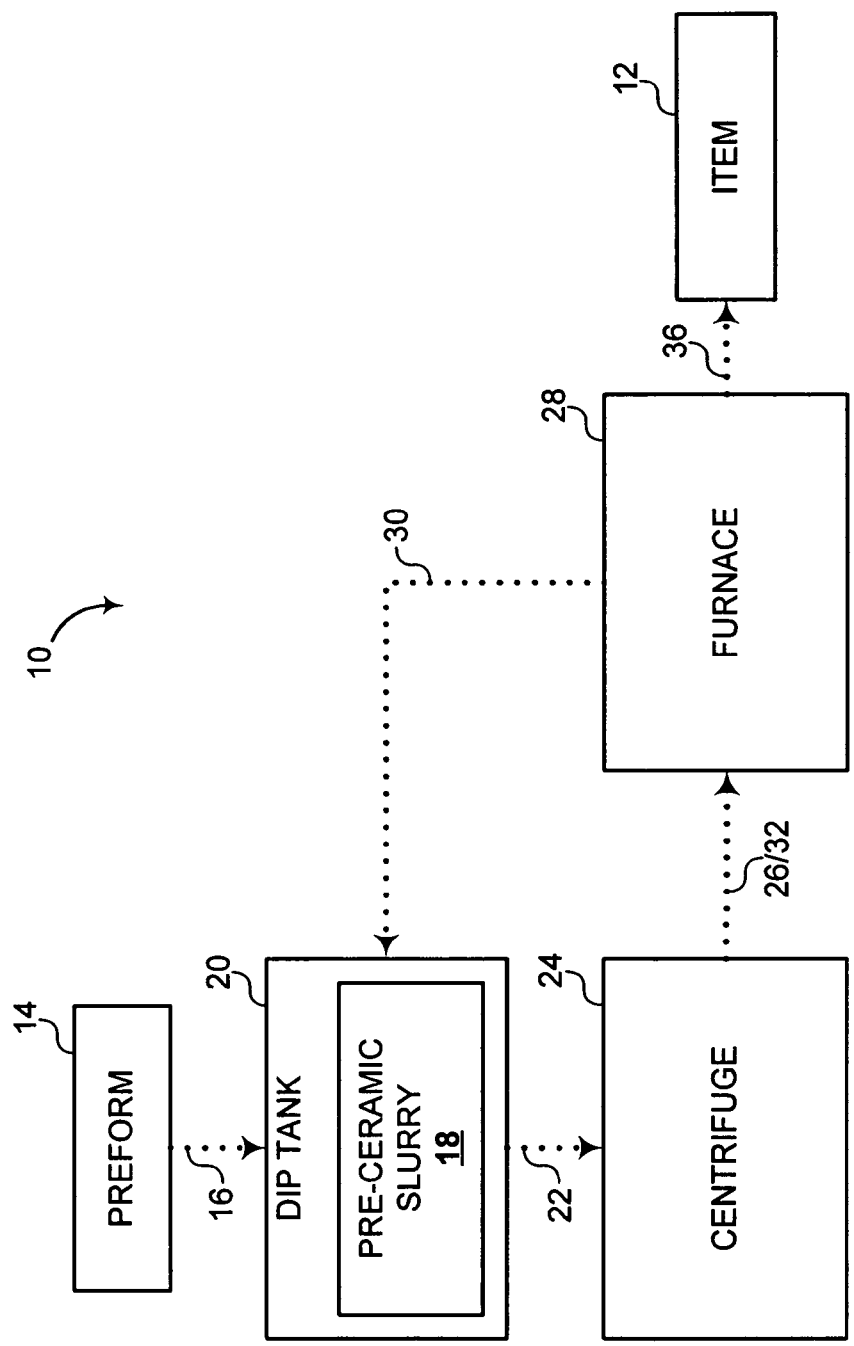
FIG. 1 is a block diagram of a system for generating a ceramic foam-filled structural sandwich panel in accordance with an embodiment of the invention.
Figure 3A:
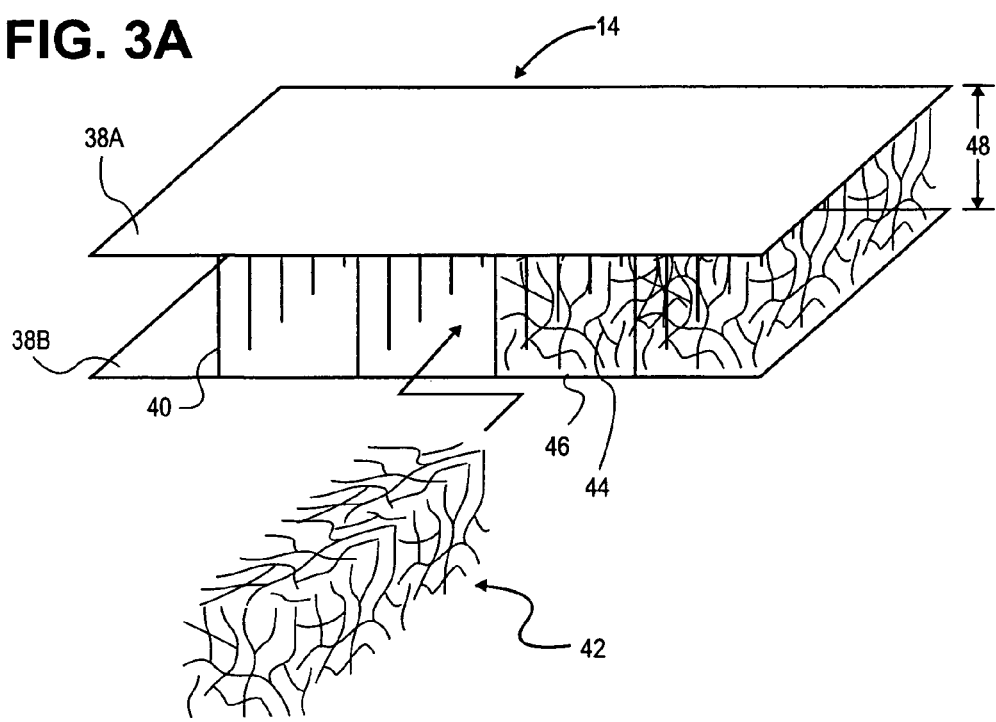
FIG. 3A is a cross sectional view of a woven ceramic fiber preform scaffold with foam template inserts suitable for fabrication with the system of FIG. 1.

Embodiments of the present invention provide a ceramic foam-filled structural sandwich panel and a system and method of generating this formation. Preferred embodiments of the invention will now be described with reference to the drawing figures, in which like reference numerals refer to like parts throughout. FIG. 1 is a block diagram of a system 10 for generating a ceramic foam-filled structural sandwich panel 12 in accordance with an embodiment of the invention. As shown in FIG. 1, the system 10 includes a preform 14 that is filled with a foam template 42 as shown in FIG. 3A and coated 16 with a slurry of pre-ceramic solution 18 in a dip tank 20. Excess slurry 18 is removed 22 from the preform 14 and template 42 in a centrifuge 24. The coating of slurry 18 is cured 26 upon the preform 14 and template 42 in a furnace 28.

The preform 14 and template 42 may be re-coated 30 with the slurry of pre-ceramic solution 18 any suitable number of times in order to generate an appropriate thickness of the cured ceramic. In response to generating an appropriately thick coating, the template 42 is optionally left in place or removed by melting or burning and/or the cured pre-ceramic coating may be converted 32 to a crystalline form in the furnace 28. Subsequent to the conversion 32, any suitable post-conversion processing 36 may, optionally, be performed upon the ceramic.

The preform 14 includes any mechanically and thermally suitable structure used to contain a second "open" structure. In an embodiment, the preform 14 is a structure that is comprised of a pair of woven sheets of ceramic or carbon fibers held together by walls or struts comprising ceramic or carbon fibers (shown in FIGS. 2, 3a and 3b). As used herein, the term "open" describes a structure having few, if any, enclosing or confining barriers or describes a structure or template 42 that facilitates the flow through of a liquid or slurry. Examples of open structures include open-cell foams, woven or lattice-like structure, aerogels, felted fibers and other such essentially random structures, and the like. As defined herein, the terms 'foam' and 'foam-filled' are used to describe such open structures. These or other such open structures relevant to embodiments of the invention may include materials that are stable at elevated temperatures and/or materials that melt or decompose at elevated temperatures. In a few particular examples, the template 42 may include a polyurethane foam, carbon aerogel, felted graphite fiber, and the like.

The pre-ceramic slurry 18 may include any suitable composition or mixture of constituents capable of being transformed into a ceramic material. In general, ceramics include a class of materials of crystalline or partly crystalline structure, or of glass (amorphous), which body is produced from essentially inorganic, nonmetallic substances. More particularly, the pre-ceramic slurry 18 may include a pre-ceramic polymer, solution precursor, or other such relatively advanced pre-ceramic composition. The pre-ceramic slurry 18 may include any suitable ceramic powder. Examples of suitable ceramic powders may include SiC, BN, HfC, graphite, $Si_3N_4$, various oxides, and the like. The pre-ceramic slurry 18 may include any suitable pre-ceramic resin or binder. Examples of suitable pre-ceramic resins may include polysilazanes, polycarbosilanes, silicones, allyl-substituted hydridopolycarbosilane, polyureasilazone, silicone resin, oxide solution precursors and the like. The pre-ceramic slurry 18 may further include a carrier/solvent such as water, toluene, and the like to produce a low viscosity slurry for coating. The pre-ceramic slurry 18 may also include a catalyst/initiator to facilitate initiation of curing of the pre-ceramic polymer at a temperature below the melting/decomposition of a template 42 (shown in FIG. 3A).

The dip tank 20 facilitates coating the template 42 with the pre-ceramic slurry 18. In a particular example, the dip tank 20 is appropriately shaped and sufficiently voluminous so that, when partially filled with the pre-ceramic slurry 18, template 42 may be submerged in the body of pre-ceramic slurry 18. In this manner, the template 42 may be coated or partially coated with the pre-ceramic slurry 18. In other embodiments, the pre-ceramic slurry 18 may be sprayed, brushed on, or otherwise applied or introduced into the template 42 and the dip tank 20 may be omitted.

In addition, the coated foam template 42 (shown in FIG. 3b) may be deposited within a ceramic fiber-reinforced scaffold or preform 14 for further processing of the ceramic foam-filled structural sandwich panel.

Depending upon a variety of factors, the centrifuge 24 is optionally utilized to remove excess pre-ceramic slurry 18 from the template 42 and the preform 14. These factors may include one or more of: viscosity of the pre-ceramic slurry 18; pore size of the preform 18; appropriate thickness of coating on the preform 14; intended application of the ceramic foam-filled structural sandwich panel 12; empirical data; and the like. If present, the centrifuge 24 is configured to provide sufficient relative centripetal force ("RCF") so as to remove any excess amount of the pre-ceramic slurry 18. For example, the centrifuge 24 may provide from about 100 to about 1000 times gravity ("×g") of RCF. However, the centripetal force should, in general, not be so great so as to cause significant deformation of the preform 14. Accordingly, the exact amount of centripetal force applied may vary according to the material properties of the template 42 and the preform 14, the pore size of the template 42 and the preform 14, the viscosity of the pre-ceramic slurry 18, and/or the like. In a particular example, the coated preform 14 containing the coated template 42 may be placed in the centrifuge 24 and spun at about 2000 revolutions per minute (rpm) to provide about 580×g of RCF for about 3 minutes. In other embodiments, any excess amount of the pre-ceramic slurry 18 may be removed by, for example, forced air, vibration, a flow of fluid, mechanical scraping or machining, and/or the like.

The furnace 28 provides sufficient heat to cure the coating of the pre-ceramic slurry 18 that was applied to the preform 14 containing the template 42. Depending upon the material characteristics of the pre-ceramic slurry 18, the furnace 28 may include a vacuum, inert gas environment, or other such environment as appropriate. In general, this "curing temperature" may vary according to the pre-ceramic resin system, catalyst/initiator, thickness of coating, mass of the coated preform 14 containing the coated template 42, and the like. In a particular example, the coated preform 14 containing the coated template 42 is heated to about 150° C. for 2 to 12 or more hours. In other embodiments, the coating of the pre-ceramic slurry 18 may be cured or polymerized at room temperature, for example, and the furnace 28 may be omitted for the curing step. Following curing of the coating, the preform 14 containing the coated template 42 may be coated with another coating of the pre-ceramic slurry in the dip tank 20. Alternatively, if the template 42 is coated sufficiently, the coating of the pre-ceramic slurry 18 on the preform 14 and the template 42 may be converted to a ceramic in a furnace appropriate for processing the material system of choice such as a vacuum furnace, inert gas or ambient air furnace or other such device.

The furnace 28 provides a controlled environment to convert the coating of pre-ceramic slurry 18 to a ceramic coating. Depending upon the particular pre-ceramic slurry utilized and the maximum heat treatment temperature, the ceramic coating may be crystalline, partly or semi-crystalline or amorphous. In addition, the furnace 28 may be configured to remove all or some portion of a foam template 42 (shown in FIG. 3a) and/or modify it. Modifications of the foam template 42 may include converting the foam template 42 to another form of matter such as, for example, carbonaceous, silicate, and the like through chemical reaction. In a particular example, the furnace 28 may be configured to melt, burn, or decompose at least some portion of the template 42 from the coating used to form the ceramic foam. Depending upon the makeup of the foam template 42, the foam template 42 may outgas during burning or decomposition. To reduce fracturing of, or other such injury to, the ceramic foam by rapid outgassing of the foam template 42, the furnace 28 may be configured to modify the environment surrounding the coated foam template 42 in a controlled manner. For example, the furnace 28 may be controlled to raise the temperature at a predetermined rate or in a controlled gas environment. In this manner, any gas evolved by the foam template 42 may slowly escape through the pre-ceramic slurry coating. The predetermined rate of temperature rise may be based upon one or more of: the decomposition temperature of one or more constituents of the foam template 42; the permeability of the cured pre-ceramic coating; empirical data; and the like. In a particular example, the furnace 28 may be controlled to decompose a polyurethane foam template using a heating cycle similar to the heating cycle described in Table I:

TABLE I

| Step | Starting Temp | Ending Temp | Rate |
|---|---|---|---|
| 1 | 25° C. | 200° C. | 1° C./minute |
| 2 | 200° C. | 420° C. | 0.2° C./minute |
| 3 | 420° C. | 1000° C. | 1° C./minute |
| 4 | 1000° C. | 25° C. | 2° C./minute |

In addition, depending upon the particular composition of the pre-ceramic slurry 18 utilized, the furnace 28 may be controlled to raise and/or hold the temperature at a ceramic conversion temperature for a sufficient duration to convert the cured coating of pre-ceramic slurry to a ceramic. In a particular example, the furnace 28 may be controlled to perform a conversion heating cycle similar to the heating cycle described in Table II:

TABLE II

| Step | Starting Temp | Ending Temp | Rate |
|---|---|---|---|
| 1 | 25° C. | 1400° C. | 5° C./minute |
| 2 | 1200-1400° C. | 1200-1400° C. | Hold 1 hour |
| 3 | 1200-1400° C. | 25° C. | 5° C./minute |

Following conversion to a ceramic form, the ceramic foam-filled structural sandwich panel 12 may be processed in any suitable manner. For example, the ceramic foam-filled structural sandwich panel 12 may be machined, finished, or otherwise modified. In a particular example, the ceramic foam-filled structural sandwich panel 12 may be re-infiltrated or injected with the pre-ceramic slurry 18, another pre-ceramic slurry, or another composition to replace the foam template 42. This re-infiltration may be performed before or after the heating cycle described in Table II. In addition, the ceramic foam-filled structural sandwich panel 12 may be combined with other items to fabricate a larger device. In a particular example, the ceramic foam-filled structural sandwich panel 12 may be utilized as a thermal shield. This thermal shield may include numerous sections or tiles that may be joined together in any suitable manner. It is an advantage of embodiments that the ceramic foam-filled structural sandwich panel 12 may be utilized as a thermal shield in relatively high technology applications such as re-entry and hypersonic vehicles due to the light weight, high thermal stability, and high insulation value provided by the ceramic foam-filled structural sandwich panel 12.

Figure 2:
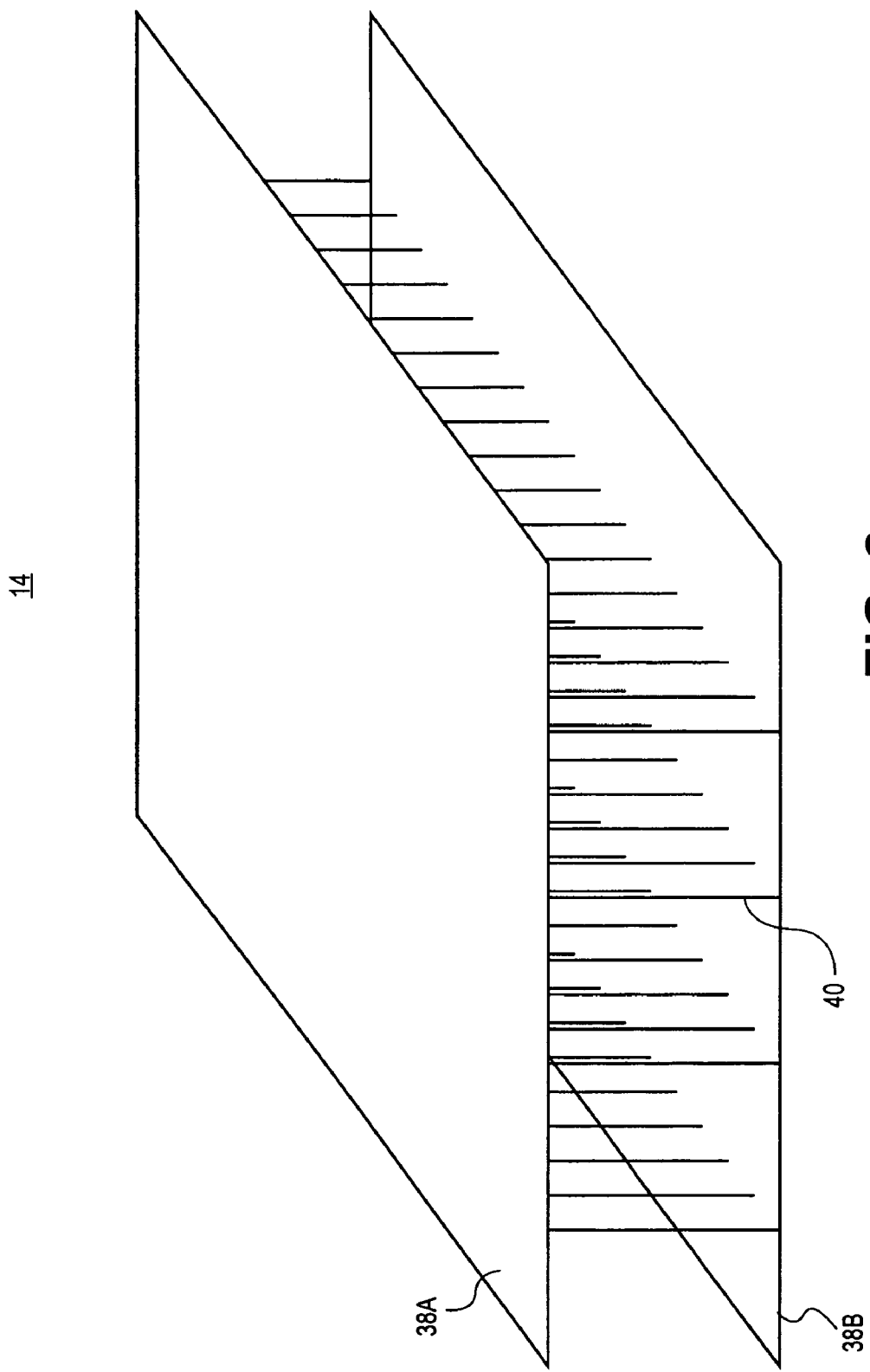
FIG. 2 is a cross sectional view of a preform for use with the system of FIG. 1.

FIG. 2 is a cross sectional view of the preform 14 according to the embodiment of FIG. 1. As shown in FIG. 2, the preform 14 includes a pair of skins 38a and 38b and a plurality of walls or struts 40. These skins 38a and 38b may provide a variety of benefits to the structural performance of the completed ceramic sandwich panel 12 (Shown in FIG. 3a). For example, the skins 38a and 38b may provide a shape holding layer, protective covering, and/or energy distribution layer for the ceramic foam. In a particular example, the skins 38a and 38b may facilitate or ease handling of the ceramic foam by increasing the overall structural rigidity, strength and durability of the system.

The skins 38a and 38b may include any suitable conformation of any suitable material. Particular examples of suitable conformations include woven fabrics, foils, films, and the like. Particular examples of suitable materials include: natural and synthetic fibers such as glass, carbon, and oxide and non-oxide ceramics. In a specific example, the skins 38a and 38b include a woven ceramic fiber panel. In addition, the skins 38a and 38b may include composite materials such as pre-ceramic or ceramic impregnated fabrics, and the like. The skins 38a and 38b may be adhered or attached to the struts 40 in any suitable manner. Examples of suitable attachment methods include integrally woven fiber walls or struts as well as adhesives and other such fastening means.

FIG. 3A is a cross sectional view of a woven ceramic fiber preform scaffold with foam inserts suitable for fabrication with the system of FIG. 1. As shown in FIG. 3a, spaces or open channels between the skins 38a and 38b and the walls or struts 40 may be filled with the foam template 42. This foam template 42 includes a connective material 44 and pores 46. The connective material 44 includes any suitable structural composition capable of maintaining a predetermined form and being coated with the pre-ceramic slurry 18. Generally, the connective material 44 includes ceramic fiber reinforcements in the form of felts or mats or polymer struts or webs. Particular examples of suitable connective materials 44 include a polyurethane foam, carbon aerogel, felted graphite fiber, and the like. The pores 46 provide a path or conduit for the pre-ceramic slurry 18 to pass through. In addition, the pores 46 may provide thermal insulation in the completed ceramic foam-filled structural sandwich panel 12 (shown in FIG. 3). These skins 38a and 38b may provide a variety of benefits to preform 14 and/or the completed ceramic foam-filled structural sandwich panel 12 (Shown in FIG. 3b). For example, the skins 38a and 38b may provide a layer, shape holding, protective covering, and/or energy distribution layer for the foam template 42. In a particular example, the skins 38a and 38b may facilitate or ease handling of the preform 14 by increasing the overall structural rigidity, strength and durability of the preform 14 as well as the completed ceramic foam-filled structural sandwich panel 12.

The foam template 42 may facilitate generating a ceramic structure that provides a relatively large amount of thermal insulation. The foam template 42 may further provide a connective layer in between the skins 38a and 38b and maintains the skins 38a and 38b a predetermined distance apart. By modifying this predetermined distance or gap 48, the insulating value and/or rigidity of the ceramic foam-filled structural sandwich panel 12 (shown in FIG. 3) may be controlled. For example, by increasing the gap 48, the insulating value of the ceramic foam-filled structural sandwich panel 12 may be increased.

Figure 3B:
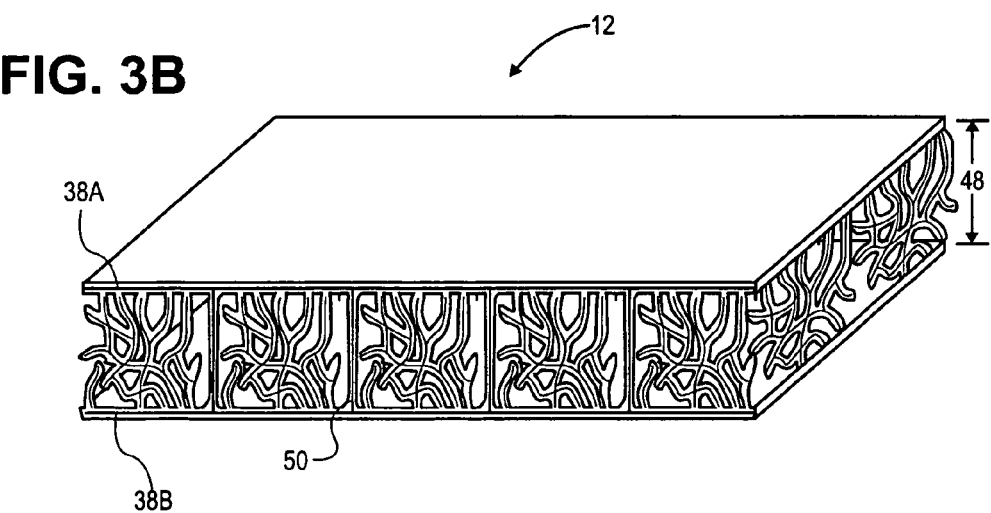
FIG. 3B is a cross sectional view of a ceramic structural sandwich panel in accordance with the embodiment of FIG. 1.

FIG. 3B is a cross sectional view of the ceramic foam-filled structural sandwich panel 12 according to the embodiment of FIG. 1. As shown in FIG. 3B, the ceramic foam-filled structural sandwich panel 12 includes a ceramic coating 50. This ceramic coating 50 may be formed by the conversion of the pre-ceramic slurry applied to the connective material 44 and/or the skins 38a and/or 38b. It is an advantage of embodiments of the invention that the ceramic foam-filled structural sandwich panel 12 may be relatively rigid and/or strong and relatively lightweight. For example, for a given volume defined by the skins 38a and 38b, the density (e.g., weight divided by volume) may be relatively low. In this regard, it is an advantage of an embodiment of the invention that light weight, high strength rigid thermal insulating structures for use in re-entry and hypersonic vehicles may be fabricated.

Figure 4:
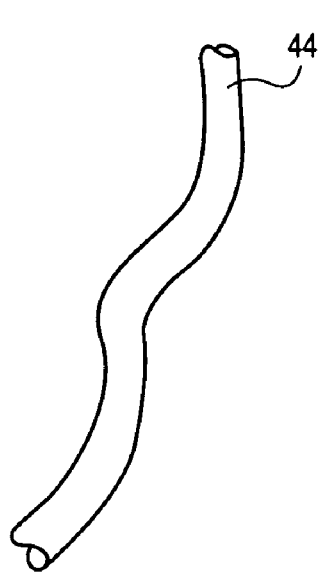
FIG. 4 is a cross sectional view of a connective material at a first stage in a process of fabricating the ceramic item according to the embodiment of FIG. 1.
Figure 5:
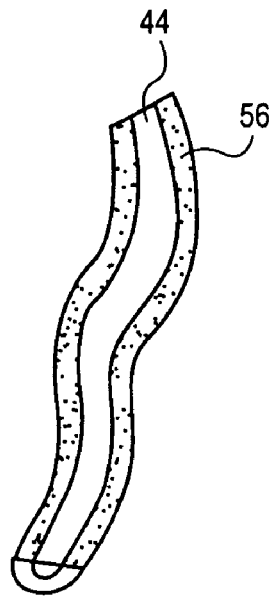
FIG. 5 is a cross sectional view of the connective material and a pre-ceramic coating at a second stage in the processes of fabricating the ceramic item according to the embodiment of FIG. 1.
Figure 6:
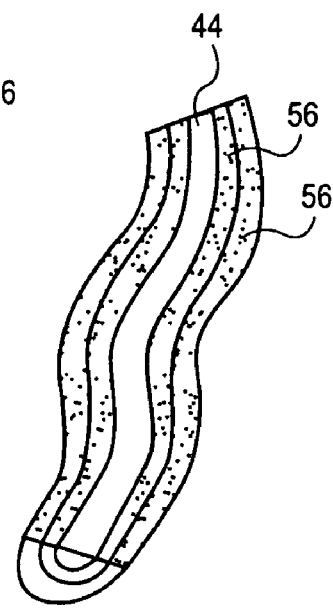
FIG. 6 is a cross sectional view of the connective material and the pre-ceramic coating at a third stage in the processes of fabricating the ceramic item according to the embodiment of FIG. 1.
Figure 7:
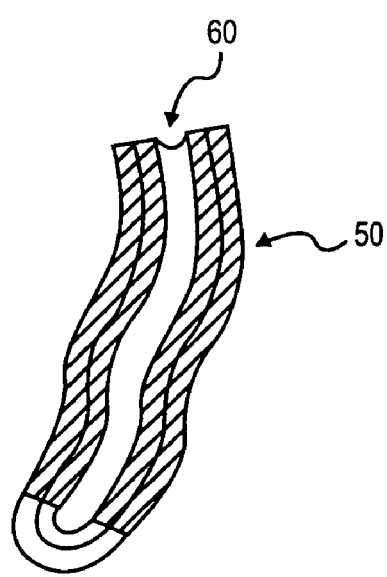
FIG. 7 is a cross sectional view of a channel and a ceramic coating at a fourth stage in the processes of fabricating the ceramic item according to the embodiment of FIG. 1.
Figure 8:
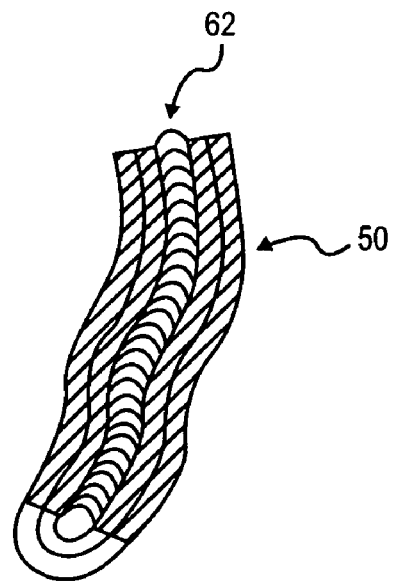
FIG. 8 is a cross sectional view of a core and the ceramic coating at a fifth stage in the processes of fabricating the ceramic item according to the embodiment of FIG. 1.

FIGS. 4 to 8 are cross sectional views of the connective material 44 and ceramic coating 50 at various stages of processing or fabricating the ceramic foam-filled structural sandwich panel 12 according to the embodiment of FIG. 1. As shown in FIG. 4, the connective material 44 may include a fiber or fibrous material. As shown in FIG. 5, the connective material 44 may be coated with the pre-ceramic slurry 18 to generate a first pre-ceramic coating 56. Following curing, the connective material 44, as shown in FIG. 6, may be coated again with the pre-ceramic slurry 18 to generate a second pre-ceramic coating 58. In an embodiment, the connective material 44 may decompose or be burned out during heat cycling of the coated preform 14. For example, as shown in FIG. 7, a channel 60 may be formed within the ceramic coating 50 as a result of the decomposition of the connective material 44. Additionally, in this or another embodiment, the channel 60 may be filled with any suitable substance to generate a core 62. Examples of suitable fillers for the channel 60 include a pre-ceramic slurry such as the pre-ceramic slurry 18, refractory metals, and the like.

Figure 9:
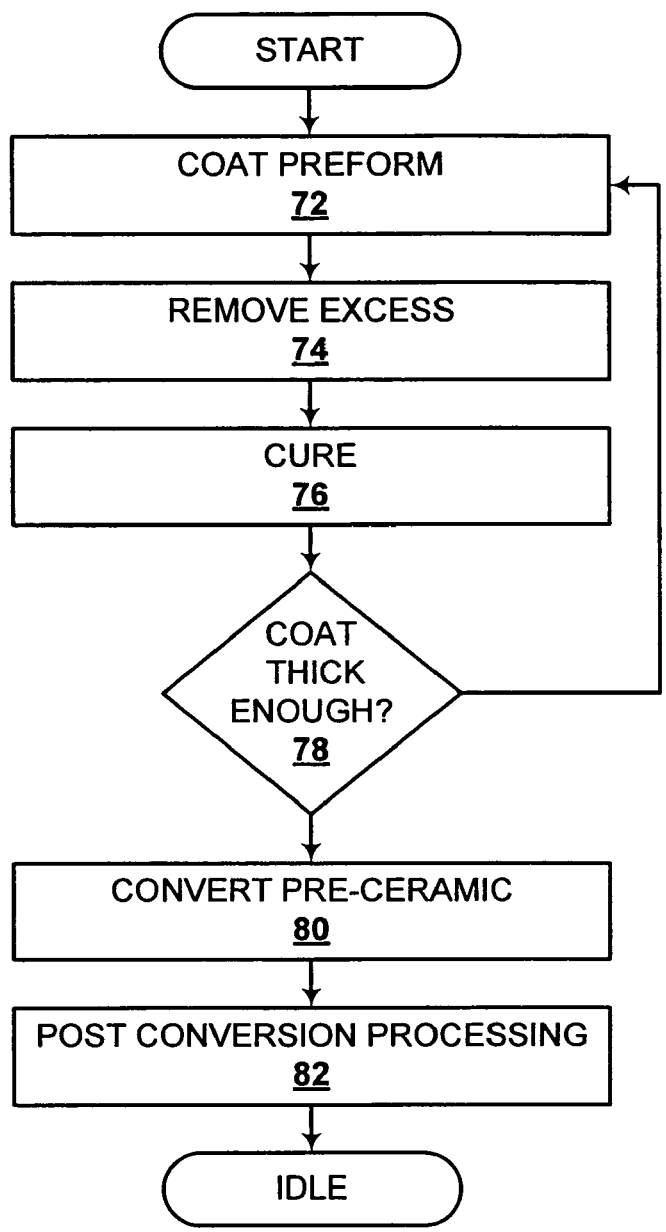
FIG. 9 is a flow diagram of a method for fabricating the ceramic foam-filled structural sandwich panel according to an embodiment of FIG. 1.

FIG. 9 is a flow diagram of a method 70 for fabricating the ceramic foam-filled structural sandwich panel 12 according to an embodiment of FIG. 1. Prior to initiation of the method 70, the ceramic foam-filled structural sandwich panel 12 may be designed and a preform similar to the preform 14 may be fabricated based upon this design. In addition, ceramic properties may be evaluated to determine a ceramic composition that best comports with any design parameters. Furthermore, the viscosity of the pre-ceramic slurry 18 may be evaluated and/or modified as appropriate through changes in the concentration of any or all constituents.

At step 72, the pre-ceramic slurry 18 may be applied to the preform 14. For example, the preform 14 may be dipped into the dip tank 20. In other embodiments, the pre-ceramic slurry 18 may be sprayed, deposited, applied, or otherwise introduced to the preform 14.

At step 74, any excess pre-ceramic slurry 18 may be removed from the preform 14. For example, if excess pre-ceramic slurry 18 partially or completely fills the pores 46, this excess may be removed. In a particular example, the coated preform 14 may be spun in the centrifuge at about 600×g of RCF for about 3 minutes to remove any excess pre-ceramic slurry 18. In other embodiments, any excess amount of the pre-ceramic slurry 18 may be removed by, for example, forced air, vibration, a flow of fluid, mechanical scraping or machining, and/or the like.

At step 76, the coating of pre-ceramic slurry 18 may be cured upon the preform 14. For example, the coated preform 14 may be placed in the furnace 28 and heated to about 150° C. for 2 to 12 or more hours. In other embodiments, the coating of the pre-ceramic slurry 18 may be cured or polymerized at room temperature, for example, and the furnace 28 may be omitted for this processing step.

At step 78, it may be determined whether or not the coating of the pre-ceramic slurry is thick enough. For example, based upon empirical testing, it may be found that 3 coats of the pre-ceramic slurry 18 is sufficient to produce an appropriately thick coating. In another example, a sample may be tested by measuring the thickness of a particular area and comparing this measurement to a measurement taken of the same area prior to coating. In yet another example, the coated preform 14 may be weighed and that weight compared to a weight prior to coating. If it is determined that the coating of the pre-ceramic coating is sufficiently thick, the coated preform may be heated at step 80. If it is determined that the coating is insufficient, another coating may be applied at step 72.

At step 80, the coating of cured pre-ceramic slurry 18 may be converted to the ceramic coating 50. For example, the furnace 28 may be controlled to perform a heating cycle similar to the heating cycle described in Table II. In addition, some or all of the template 42 may optionally be decomposed, burned, or otherwise modified. For example, prior to, during, or after the step 80, the coated template 42 may be heated in a controlled manner to reduce the rate of outgassing and thus, reduce any occurrence of fracturing in the pre-ceramic coating 56 and/or 58. In a particular example of this optional step, the coated preform 14 is heated in the furnace 28 according to the heating cycle described in Table I.

At step 82, the ceramic foam-filled structural sandwich panel 12 may be processed in any suitable manner. For example, the ceramic foam-filled structural sandwich panel 12 may be machined, finished, or otherwise modified. In a particular example, the ceramic foam-filled structural sandwich panel 12 may be re-infiltrated or injected with the pre-ceramic slurry 18, another pre-ceramic slurry, or another composition to replace the connective material 44 and generate the core 62. For example, the ceramic foam-filled structural sandwich panel 12 may be re-infiltrated with a tough, malleable, and/or energy absorbing material configured to improve the toughness of the ceramic foam-filled structural sandwich panel 12. Specific examples of re-infiltrating materials may include pre-ceramic resins, metals and the like depending on the required use conditions. This re-infiltration may be performed after the heating cycle described in Table II. In addition, the ceramic foam-filled structural sandwich panel 12 may be combined with other items to fabricate a larger device. In a particular example, the ceramic foam-filled structural sandwich panel 12 may be utilized as a thermal shield. It is an advantage of embodiments that the ceramic foam-filled structural sandwich panel 12 may be utilized as a thermal shield in relatively high technology applications such as re-entry and hypersonic vehicles due to the light weight, high thermal stability, and high insulation value provided by the ceramic foam-filled structural sandwich panel 12. Following the step 84, the system 10 may idle until the method 70 is performed again.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A system for producing a ceramic foam-filled structural sandwich panel, the system comprising:
   means for receiving a foam template within a preform, the preform comprising a pair of skins interconnected by a plurality of walls or struts;
   means for applying a coating of a pre-ceramic slurry on the preform;
   means for curing the coating to the preform;
   means for modifying the preform; and
   means for converting the coating to a ceramic.

2. The system according to claim 1, further comprising:

means for applying an additional coating of the pre-ceramic slurry on the preform in response to the coating thickness being less than a predetermined minimum thickness; and means for curing the additional coating to the coating.

3. The system according to claim 1, further comprising:

a dip tank for dipping the preform in the pre-ceramic slurry to apply the coating.

4. The system according to claim 1, further comprising:

means for removing excess pre-ceramic slurry prior to curing the coating to the preform.

5. The system according to claim 4, wherein the means for removing excess pre-ceramic slurry prior to curing the coating to the preform-comprises:

means for applying from about 100×g to about 1000×g of relative centripetal force to the preform to remove the excess pre-ceramic slurry.

6. The system according to claim 1, wherein the means for modifying the preform comprises:

means for subjecting the preform to a modifying heating cycle to modify the preform, the modifying heating cycle comprising:

heating the preform from about 25° C. to about 200° C. at about 1° C. per minute;

heating the preform from about 200° C. to about 420° C. at about 0.2° C. per minute;

heating the preform from about 420° C. to about 1000° C. at about 1° C. per minute; and cooling the preform from about 1000° C. to about 25° C. at about 2° C. per minute.

7. The system according to claim 1, wherein the means for converting the coating to a ceramic comprises:

means for subjecting the coating to a converting heating cycle to convert the coating to the ceramic, the converting heating cycle comprising:

heating the coating from a relatively lower temperature of about 25° C. to a relatively higher temperature of about 1200° C. to about 1400° C. at about 5° C. per minute;

maintaining the coating at about 1200° C. to about 1400° C. for about 1 hour; and cooling the coating from a relatively higher temperature of about 1200° C. to about 1400° C. to a relatively lower temperature of about 25° C. at about 5° C. per minute.

* * * * *